April 19, 1949.       R. J. BARRY       2,467,877
FASTENING DEVICE
Filed May 22, 1946
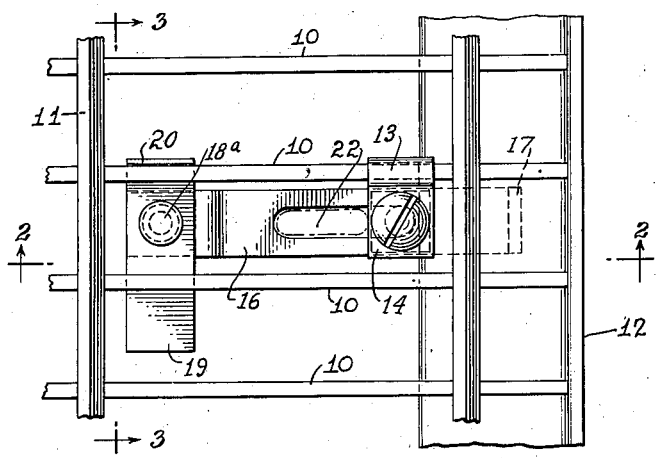
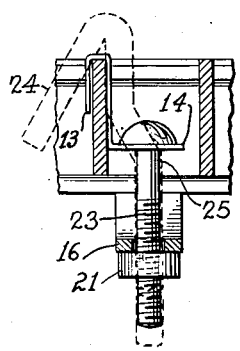
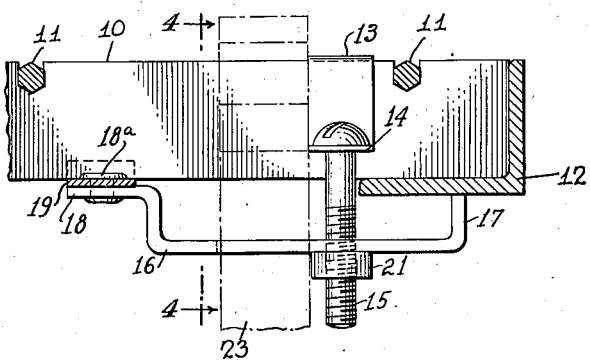
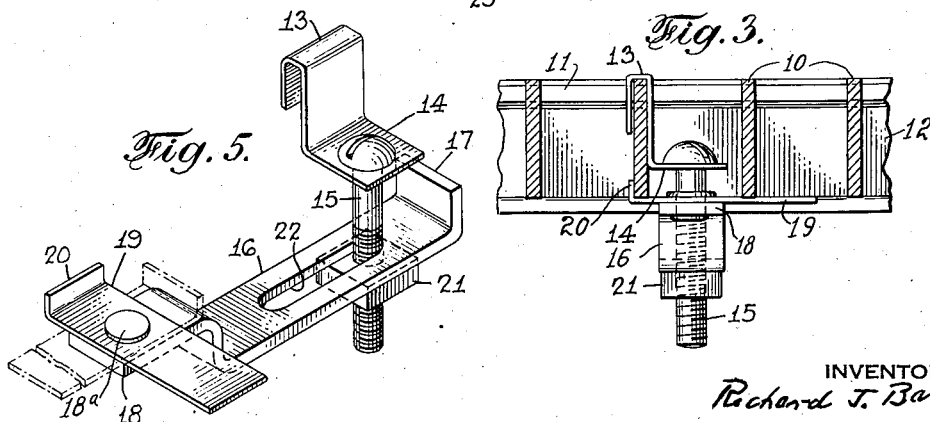
INVENTOR
Richard J. Barry
BY
ATTORNEY Patented Apr. 19, 1949

2,467,877

UNITED STATES PATENT OFFICE 2,467,877

FASTENING DEVICE

Richard J. Barry, New York, N. Y., assignor, by mesne assignments, to Irving Subway Grating Co., Inc., Long Island City, N. Y., a corporation of New York Application May 22, 1946, Serial No. 671,516

6 Claims. (Cl. 189—84)

This invention relates to new and useful improvements in removable fasteners and has special reference to fasteners of the type which are employed to fasten sections of metal grating as are used on bridge roadways, subway gratings and the like to their supporting structures or frames.

It is a general object of my invention to provide a removable fastening means which can be readily applied by inserting the fastener between the adjacent bars of the grating, adjusting the parts thereof to their proper positions and then securing the same in place to the frame from above or beneath.

Another object of the invention is to provide a removable grating fastener which is simple, efficient, strong and easily manipulated, and which can be installed with a minimum expenditure of time and effort.

A further object is to provide a fastener which, when preliminarily installed, can be tightened up without having to hold the parts of the fastener in place during the tightening operations.

A still further object is to provide a fastener composed of a few simple parts which can be economically manufactured and assembled and which require a minimum of space for storage and shipment.

Further and more specific objects, features, and advantages will more clearly appear from a consideration of the specification hereinafter set forth, especially when taken in connection with the accompanying drawings, which illustrate a present preferred form which the invention may assume and which form part of the specification.

In the briefest and most general terms, the invention comprises an e'ement to be hooked over the top of one of the bars to be secured in place in a supporting frame, together with an anchor plate disposed beneath the bar and drawn toward the hooked element by a bolt-nut connection. The anchor plate has a slot in one end of which the bolt stem lies with the nut below the plate. The rest of the slot during assembly is occupied by a flat tool or bar which lies adjacent the side of the nut to keep it from turning, so that the two hands of the workman can be free to tighten and adjust the other parts without having to hold the nut. One end of the anchor plate bears against the under side of a portion of the supporting frame element and the other end is provided with means to bridge at least two of the bars on their underside to give a firm anchorage to the plate as it is tightened into position.

In a particular form of the invention the hooked element has a shoulder to receive the head of the bolt and the anchor plate at one end has a swivelled bar-bridging piece which can be disposed, when in position, at right angles to the anchor plate to give the firm broad grip on the bars above referred to. The tool for holding the nut is temporarily hooked over the top of the bar and can be easily thrust through the slot and as easily removed therefrom after the adjustment has been made.

The present preferred form which the invention may assume is illustrated in the drawings of which:

Fig. 1 is a partial plan view of the device in position;

Fig. 2 is a vertical section taken on the line 2—2 of Fig. 1;

Fig. 3 is a vertical section taken on the line 3—3 of Fig. 1;

Fig. 4 is a vertical section taken on the line 4—4 of Fig. 2; and

Fig. 5 is a perspective view of the device by itself.

The present preferred form of the invention has to do with means to clamp grating panels to their supporting frames. Such panels are those which are generally formed of bars rectangularly disposed in sections and riveted or welded together to form a flooring for bridges, highways, for ventilating gratings over subway air passages and the like. For purposes of repair and replacement, it is very desirable that the various sections, especially subway grating sections, be removable with ease and without loss of time and with equal dispatch put back into place without much expenditure of time and effort.

As shown in the drawings, the preferred form comprises a series of flat bars 10 arranged parallel and spaced apart and joined by welding or riveting or by other suitable means in sections to cross bars or rods 11. These sections are generally to be placed on supporting frame members of which the angle plate 12 is an example.

In order to hold each section in place on the frame, it is necessary to grip one side of at least one bar, dispose a clamping or anchor plate to engage the other side of said bar and a portion of the supporting frame, connect the two bar engaging means by an adjustable means such as a bolt and nut, and provide some means to keep the anchor plate from shifting its position on its side of the engaged bar.

To achieve these general effects the specific means shown comprises a bar-engaging member shown in the form of a hook element 13 to be disposed over the top edge of one of the bars 10, This hook has a flat laterally projecting shoulder 14 at one end apertured to pass a headed bolt 15.

Disposed below the bar 10 to which the hook 13 may be engaged is a plate 16 which acts as a clamping or anchor device below the bar 10 and which is provided with an upturned lip 17 at one end to be disposed below and in engagement with the lower surface of the frame member or angle plate 12 and with an offset ledge 18 at its other end on which is swivelled at 18a a bridging supporting plate 19 having an upturned lip 20 at one end and adapted to be disposed in an operative position when in place, transverse to the anchor plate 16 and bridging at least two of the bars 10.

The bolt 15 is provided with a nut 21 near its lower end below the anchor plate 16. The stem of the bolt 15 passes through an elongated slot 22 in the anchor plate and in use lies at one end of said slot. The width of the slot is such that a flat bar-like tool 23 can be inserted down through the slot alongside the nut 21 and fill the remainder of the slot so as to lie against the nut and prevent its turning while a screwdriver is turning the top of the bolt to draw the hook 13 and the anchor plate 16 together to firmly clamp the bar 10 in position. This tool also holds the plate 16 in proper alignment with the grating bars while the bolt is being tightened. This tool preferably has a hooked upper end 24 which hangs over the top of the bar 10 after it is inserted in the slot, and, of course, can be removed after the bolt has been tightened up the desired extent. Thus, after the fastener has been preliminarily installed, this tool will permit the operator's two hands to be free to adjust the parts and tighten them up and yet keep the parts in alignment and the nut from turning. It is generally preferable to offset the tool 23 as at 25 so that it will project directly down through the slot 22 while at the same time be able to hug the top of the bar 10 while in use although this offset could be dispensed with without impairing its function.

One of the principal advantages of the fastener is that the parts thereof prior to being tightened are loosely connected in somewhat parallel relation so that they occupy much less space than when in use and therefore it is easy to pass them down between the bars 10 which are spaced apart as seen in Fig. 1. The length of the slot 22 is such that the bolt 15 with the nut moved down on it can be disposed quite nearly flat against the plate 16 and the bridging plate 19 of course is disposed in the position indicated in dotted lines in Fig. 5 when not in operative bridging position. Thus it is an easy matter for the workman to take the device out of stock, pass the plate 16, the bolt 15, and the bridge piece 19 down between the bars. Then the hook 13 is disposed over the top of the bar 10, anchor plate 16 is swung beneath and parallel to the bars 10 with one end disposed beneath the frame angle bar 12 and with the swivel bridge piece 19 disposed at right angles to the bars 10, and the lip 20, as shown in Fig. 3, disposed flat against the bar 10 with which the hook 13 engages. The tool 23 is then inserted through the slot 22 and its adjacency to the nut will keep the nut from turning while the two hands of the workman are engaged in tightening up on the bolt with a screw driver. When this adjustment is tight enough then the tool 23 is removed and the parts are in their assembled relation.

While the invention has been described in detail and with respect to a present preferred form which the invention may assume, it is not to be limited to such details and form since many changes and modifications may be made in the the invention without departing from the spirit and scope of the invention in its broadest aspects. Hence it is desired to cover any and all forms and modifications of the invention which may come within the language or scope of any one or more of the appended claims.

What I claim as my invention is:

1. A fastening device for engagement with spaced bars of a grating and with a frame in which said grating is located, said fastener comprising, a hooked element disposed over the top of one of the bars of the grating, an anchor plate disposed below and along the bottom of said grating bar, a bolt and nut connection extending between the anchor plate and the hooked element and operative to draw said plate and hooked element toward one another, the anchor plate being provided with a slot through which the bolt extends, the nut on the bolt being located below the anchor plate, said slot being adapted to receive a tool fitting the slot between the nut and one end of the slot to thereby engage against a part of the nut and prevent rotative movement of the same, the anchor plate having an end bearing under a portion of the grating frame, a swivel bridge piece at the other end of the anchor plate, said bridge piece being pivotal to position it at right angles to the anchor plate and thereby cause it to bridge and bear against at least two adjacent grating bars, said bridge piece having an upwardly turned lip resting against the side of the grating bar that is engaged by the hooked element.

2. A fastening device for engagement with spaced bars in a grating and the frame in which the grating is mounted, said fastening device comprising, a hook member fitting over the top of one of the grating bars, said hook member having a downwardly and laterally extending part located between said grating bar and an adjacent grating bar, an anchor plate located below the grating bar, said anchor plate having a longitudinally extending, elongated slot, a bolt extending between the laterally extended portion of the hook member and the anchor plate and projecting through the slot in the anchor plate, a nut on the bolt located below the anchor plate, the anchor plate having an upturned lip at one end for engagement against a part of the frame in which the grating is mounted, a bridge piece pivotally carried at the opposite end of the anchor plate, said bridge piece being adapted to be pivotally moved to cause it to straddle the two grating bars between which the anchor plate is located.

3. A fastening device as provided for in claim 2, wherein the bridge piece is provided with an upturned lip at one end for disposition against the side face of one of the grating bars when the bridge piece is in position of straddling said two grating bars.

4. A fastening device for engagement with spaced bars in a grating and with the frame in which said grating is mounted, said fastening device comprising, a hook member engaging over the top of one of the bars, an anchor plate located below the bars in the grating, said anchor plate having an elongated slot, a threaded bolt passing through the hook member and through the slot in the anchor plate, the bolt carrying a nut disposed below the anchor plate, the bolt being disposed at one end of the slot whereby a tool may be hooked over one of the grating bars and extended through the slot between one end of the slot and the nut on the bolt to thereby prevent turning movement of the nut on the bolt, the anchor plate having an element at one end for engagement with the frame in which the grating is mounted, and a movable element at its opposite end for engagement with two adjacent bars of the grating.

5. A fastening device for engagement with spaced bars in a grating and with the frame in which the grating is mounted, said fastener having a top element fitting over the top of one of the bars, a bottom element fitting below the bars, a bolt and nut passing through both elements for adjustably drawing the same toward one another, the bottom element being slotted and the bolt extending through the slot therein and having its nut positioned beneath the lower element, the lower element having an end member bearing against the grating frame and having a pivoted member at its opposite end movable to bridge at least two of the grating bars.

6. In a fastening device as provided for in claim 5, wherein the end member on the bottom element is in the form of an upturned lip, and wherein the pivoted member is provided at one end with an upturned lip for engagement against one of the grating bars.

RICHARD J. BARRY.

REFERENCES CITED

The following references are of record in the file of this patent:

UNITED STATES PATENTS

| Number | Name | Date |
|---|---|---|
| 1,568,122 | Zifferer | Jan. 5, 1926 |
| 2,175,453 | Barcy | Oct. 10, 1939 |

FOREIGN PATENTS

| Number | Country | Date |
|---|---|---|
| 693,379 | France | 1930 |

OTHER REFERENCES

Catalog 137, Reliance Steel Products Co., McKeesport, Penna. (Copyright 1937), page 11, fastener RF8 (94–30).